(12) United States Patent
Welchko et al.

(10) Patent No.: US 7,154,237 B2
(45) Date of Patent: Dec. 26, 2006

(54) UNIFIED POWER CONTROL METHOD OF DOUBLE-ENDED INVERTER DRIVE SYSTEMS FOR HYBRID VEHICLES

(75) Inventors: Brian Welchko, Madison, WI (US); James M. Nagashima, Cerritos, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/043,341

(22) Filed: Jan. 26, 2005

(65) Prior Publication Data

US 2006/0164027 A1    Jul. 27, 2006

(51) Int. Cl.
*H02P 7/74* (2006.01)
*H02P 5/00* (2006.01)

(52) U.S. Cl. .................. 318/105; 318/139; 318/254; 363/41; 363/71

(58) Field of Classification Search .............. 363/71, 363/72, 41; 318/801, 105, 139, 254
See application file for complete search history.

(56) References Cited

U.S. PATENT DOCUMENTS

| | | | | |
|---|---|---|---|---|
| 4,532,458 A * | 7/1985 | Kuznetsov et al. | ......... | 318/111 |
| 5,253,155 A * | 10/1993 | Yamamoto | ................ | 363/71 |
| 5,389,749 A * | 2/1995 | Hokari et al. | ............ | 187/293 |
| 5,414,615 A * | 5/1995 | Kumar et al. | .............. | 363/95 |
| 5,657,217 A * | 8/1997 | Watanabe et al. | ......... | 363/71 |
| 5,705,909 A * | 1/1998 | Rajashekara | ............. | 318/801 |
| 5,923,550 A * | 7/1999 | Kumar | .................... | 363/69 |
| 6,040,989 A * | 3/2000 | Thorn et al. | .............. | 363/41 |
| 6,242,884 B1 * | 6/2001 | Lipo et al. | .............. | 318/808 |
| 2004/0262057 A1 * | 12/2004 | Kumar | .................. | 180/65.2 |
| 2006/0108957 A1 * | 5/2006 | Urakabe et al. | ......... | 318/139 |

OTHER PUBLICATIONS

Corzine K.A., et al., "Performance Characteristics of a Cascaded Two-Level Converter," IEEE Transactions on Energy Conversion, vol. 14, Issue 3, Sep. 1999, pp. 433-439.
Junha Kim, et al., "Dual-Inverter Control Strategy for High-Speed Operation of EV Induction Motors," IEE Transactions on Industrial Electronics, vol. 51, Issue 2, Apr. 2004, pp. 312-320.
Shivakumar, E.G., et al., "Space Vector PWM Control of Dual Inverter Fed Open-End Winding Induction Motor Drive," Applied Power Electronics Conference and Exposition, 2001. APEC 2001. Sixteenth Annual IEEE, vol. 1, Mar. 4-8, 2001, pp. 399-405.

* cited by examiner

*Primary Examiner*—Paul Ip
(74) *Attorney, Agent, or Firm*—Christopher DeVries

(57) ABSTRACT

A method of providing a unified power control of a motor including providing a first inverter system, a second inverter system, and a motor coupled therebetween; coupling the first inverter system coupled to a first energy source; coupling the second inverter system coupled to a secondary energy source; generating a first pulse width modulated signal; and generating a second pulse width modulated signal. The first inverter system and the second inverter system are driven with the first pulse width modulated signal and the second pulse width modulated signal respectively in order to control a fundamental component of an output voltage of the first inverter system and the second inverter system to control the motor.

14 Claims, 6 Drawing Sheets

UNIFIED POWER CONTROL METHOD OF DOUBLE-ENDED INVERTER DRIVE SYSTEMS FOR HYBRID VEHICLES

FIELD OF THE INVENTION

The present invention relates to hybrid vehicles and, more particularly, to hybrid vehicles having a double-ended inverter drive system.

BACKGROUND OF THE INVENTION

Currently, there exist a variety of propulsion or drive technologies used to power vehicles. These technologies include internal combustion engines (ICEs), electric drive systems utilizing batteries and/or fuel cells as an energy source, and hybrid systems utilizing a combination of various drive systems. The increasing cost of fossil fuels and the desire to improve fuel economy and reduce emissions in vehicles have led to the development of advanced hybrid vehicles.

Hybrid vehicles typically include an internal combustion engine and an electric traction motor. Hybrid vehicles also may include two separate DC energy sources for the electric traction motor. During varying driving conditions, hybrid vehicles will alternate between these separate energy sources, depending on the most efficient manner of operation of each energy source.

Hybrid vehicles are also broadly classified into series or parallel drives, depending upon the configuration of the drivetrains. In the series drivetrain utilizing the ICE and the electric traction motor, only the electric motor drives the wheels of the vehicle. The ICE converts a fuel source into mechanical energy, which turns a generator that converts the mechanical energy into electrical energy to drive the electric motor. In a parallel hybrid drivetrain system, the ICE and the electric traction motor operate in parallel to propel the vehicle.

Secondary/rechargeable batteries are an important component of a hybrid vehicle system. Secondary batteries store energy that is used by the electric traction motor to drive the vehicle. In addition, secondary batteries enable an electric motor/generator (MoGen) to store energy that is recovered during braking. Accordingly, the batteries perform load balancing, absorbing, or delivering the instantaneous difference in energy generated by the ICE with that required by driving conditions.

A battery module may be comprised of several series-connected electrochemical cells. Typical electrochemical cell voltages are in the one to two volt range. Present battery module output voltages are in the 12 to 42 volt range. Conventional vehicle traction drive systems operate with a DC bus voltage in the range of approximately 300 to 400 volts. In conventional electric or hybrid vehicle applications, battery modules are connected in series to provide the desired DC voltage levels required by the high voltage vehicle traction drive system. Generally speaking, a high voltage vehicle traction drive system provides cost, performance and weight advantages, as compared to low voltage traction drive systems.

Electric vehicles, including battery, hybrid, and fuel cell electric vehicles, typically use an inverter in the form of a switch-mode power supply to provide multi-phase operating power to the vehicle's electric drive motor. The inverter design most commonly used is a pulse width modulated (PWM) voltage source inverter which utilizes power transistors that can supply the high currents needed to satisfy the torque demands required by the vehicle drive motor. The inverter switches power to the drive motor windings from a direct current (DC) bus. For a low voltage system, the DC bus operates at approximately 42V for a high voltage system, the DC bus operates at approximately 350–400 volts (VDC).

The standard method to interface energy storage into an electric propulsion system for hybrid vehicles is to employ a power converter between the energy storage system and main propulsion DC bus. However, it should be appreciated that usage of such power converter unnecessarily adds to the complexity and cost of the vehicle.

SUMMARY OF THE INVENTION

A double-ended inverter system for driving a motor or other load of a vehicle is provided in accordance with the principles of the present invention having an advantageous method of use. The method includes providing a unified power control of a motor including providing a first inverter system, a second inverter system, and a motor coupled therebetween; coupling the first inverter system coupled to a first energy source; coupling the second inverter system coupled to a secondary energy source; generating a first pulse width modulated signal; and generating a second pulse width modulated signal. The first inverter system and the second inverter system are driven with the first pulse width modulated signal and the second pulse width modulated signal respectively in order to control a fundamental component of an output voltage of the first inverter system and the second inverter system to control the motor.

Further areas of applicability of the present invention will become apparent from the detailed description provided hereinafter. It should be understood that the detailed description and specific examples, while indicating the preferred embodiment of the present invention, are intended for purposes of illustration only and are not intended to limit the scope of the present invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses. As used herein, the term "module" refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 1A:
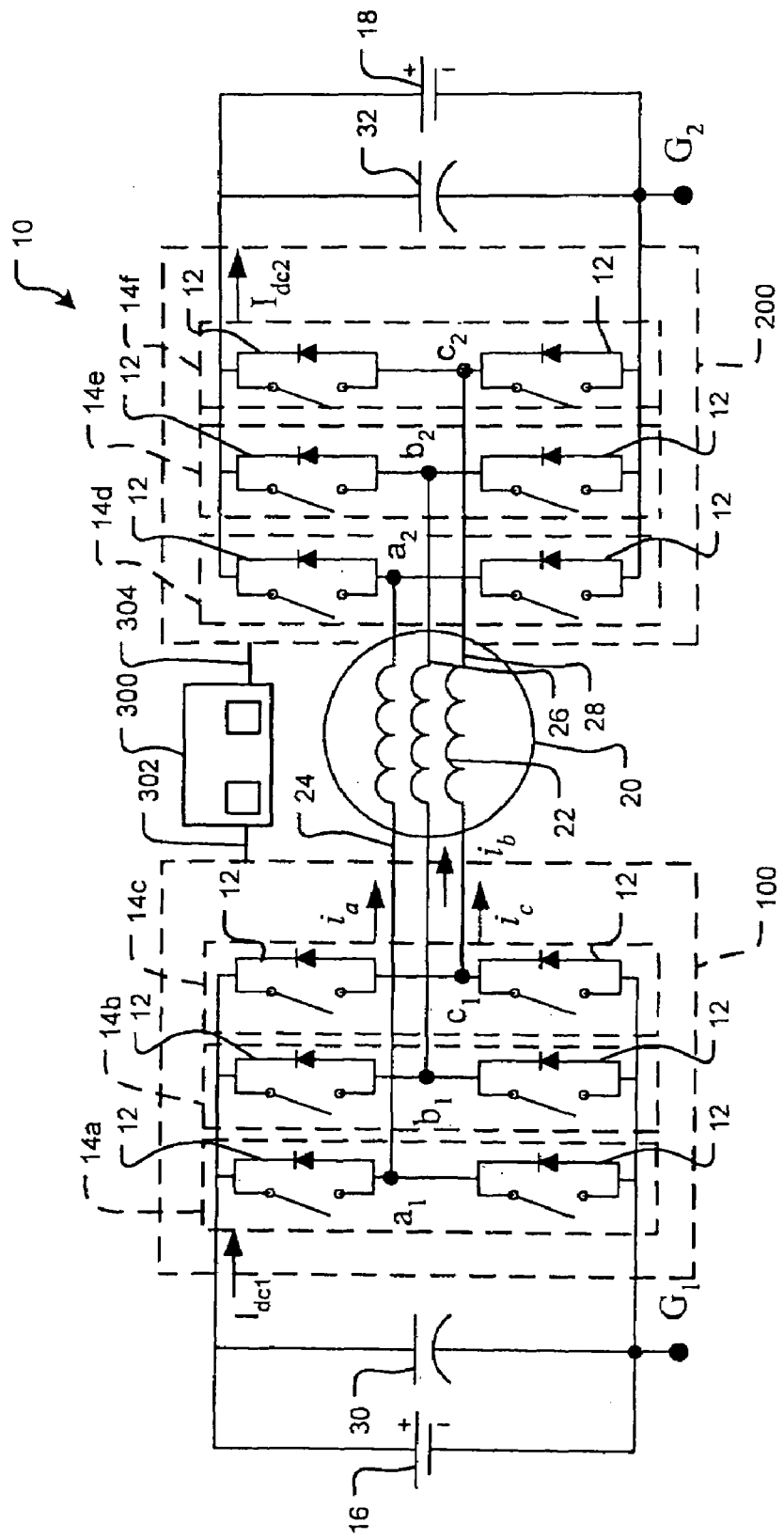
FIG. 1A is a schematic view illustrating the double-ended inverter drive system according to the principles of the present invention.
Figure 1B:
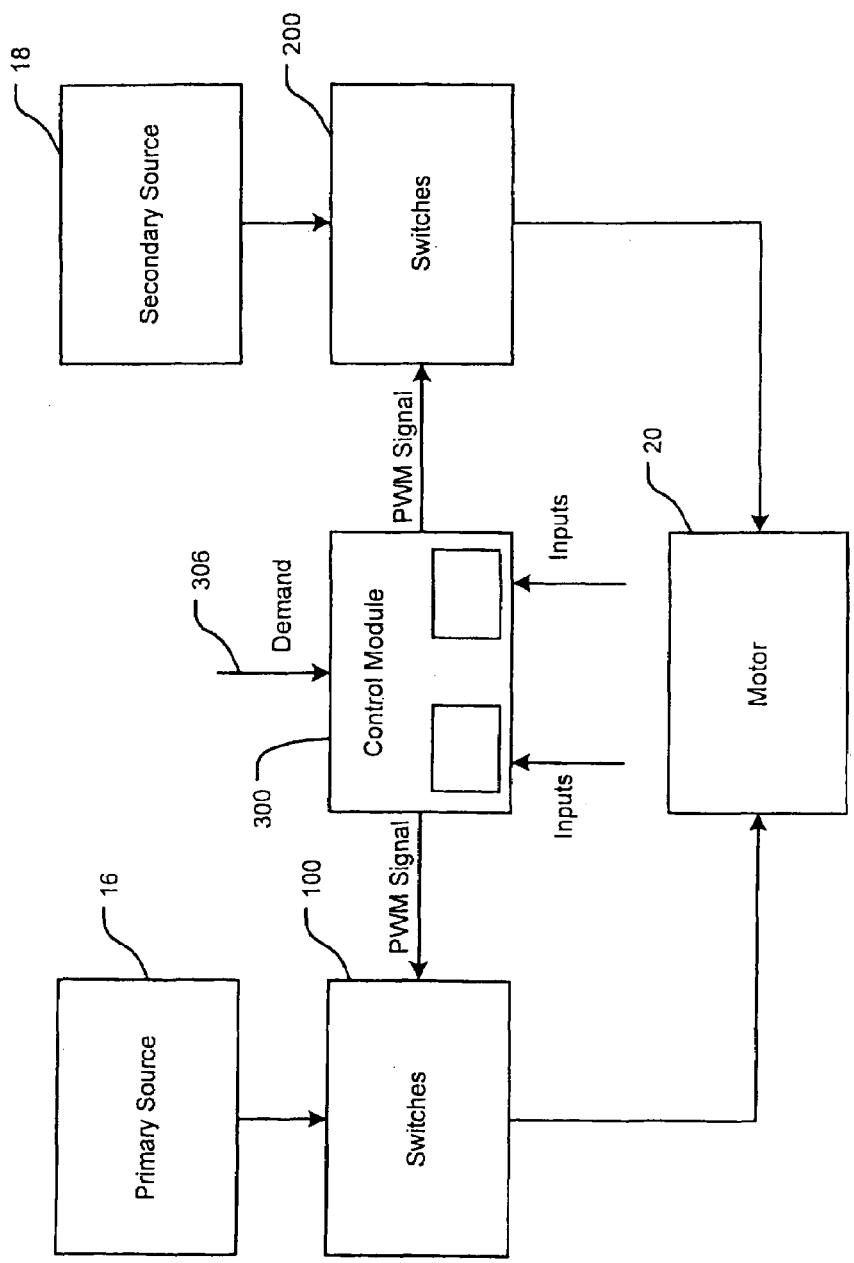
FIG. 1B is an additional schematic view illustrating the double-ended inverter drive system according to the principles of the present invention.
Figure 1C:
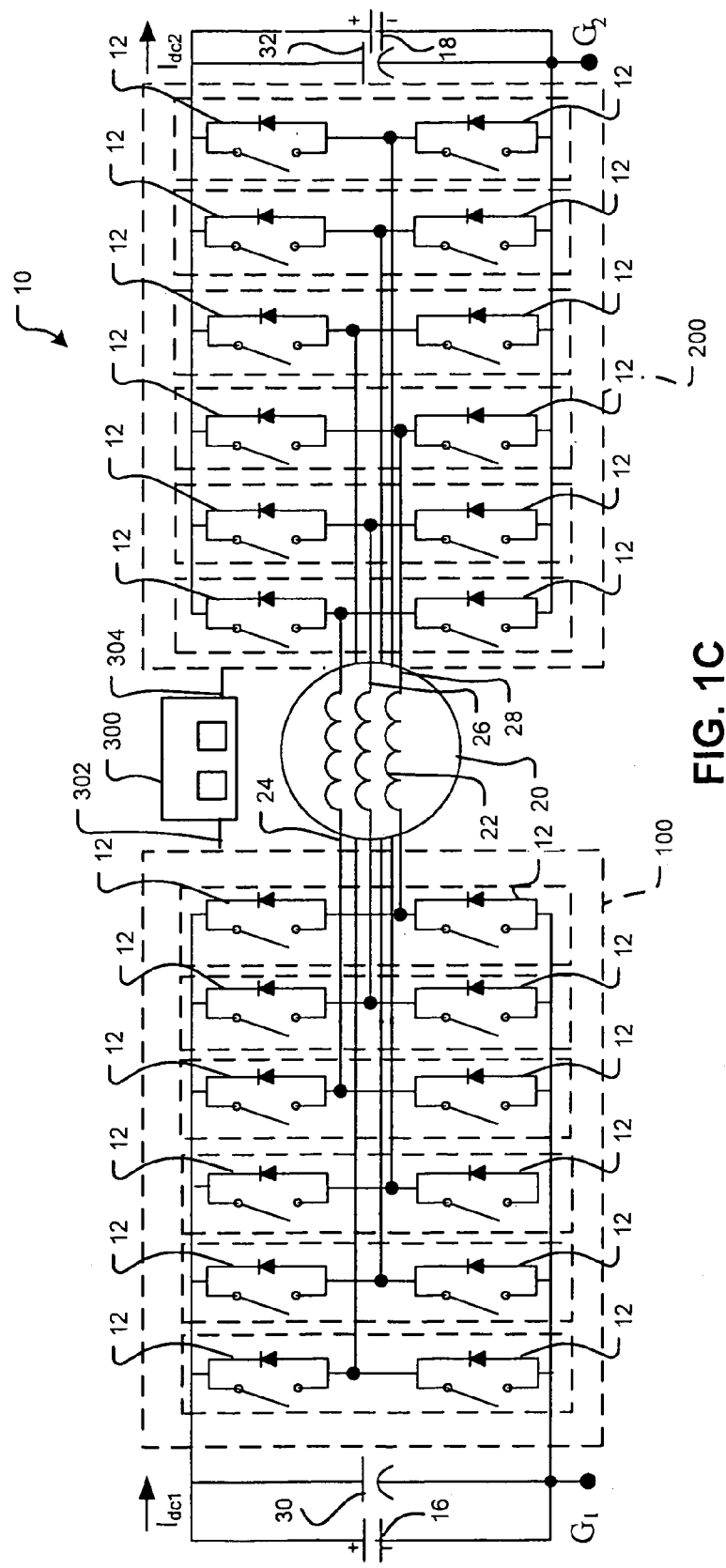

The present invention is provided simplifies the traction inverter propulsion and energy management system in hybrid vehicles so that cost reductions might be realized. To this end, as illustrated in FIGS. 1A and 1B, a double-ended inverter system 10 is provided in accordance with the principles of the present invention. Double-ended inverter system 10 is comprised of twelve current-bidirectional, voltage-unidirectional semiconductor switches 12. Semiconductor switches 12 are divided into two inverter or converter sections, namely first section 100 and second section 200. First section 100 and second section 200 are each configured into three legs 14a, 14b, 14c, and 14d, 14e, and 14f, respectively. Each of legs 14a–14f includes a pair of semiconductor switches 12 arranged in series. First section 100 and second section 200 each includes a DC energy source, namely primary energy source 16 and secondary energy source 18, which output a DC current $I_{DC1}$ and $I_{DC2}$, respectively. It should be appreciated that first section 100 and section 200 may comprise additional legs each having a pair of semiconductor switches 12 arranged in series, such as a seventh semiconductor switch and an eighth semiconductor switch arranged in series defining a fourth leg, a ninth semiconductor switch and a tenth semiconductor switch arranged in series defining a fifth leg, and a eleventh semiconductor switch and a twelfth semiconductor switch arranged in series defining a sixth leg as illustrated in FIG. 1C.

Primary energy source 16, which supplies first section 100 with power, is obtained from the vehicle's main energy source (not illustrated). This main energy source may include a fuel cell, rectified output of a generator, and/or any other known power source. Secondary energy source 18, which supplies second section 200 with power, is obtained from an onboard energy storage system (not illustrated). This onboard energy storage system may include one or more batteries, super capacitor, and/or any other known power storage source. There is no implicit assumption regarding the relative power and energy capacity of either the primary or secondary energy source in the present invention. Capacitors 30 and 32 are coupled in parallel to primary energy source 16 and secondary energy source 18, respectively, to smooth current ripple.

Still referring to FIG. 1, a three-phase AC motor 20 having windings 22 is provided. Windings 22 are in electrical communication with first section 100. More specifically, a first output $i_a$, taken from a position $a_1$ between the pair of semiconductor switches 12 of leg 14a; a second output $i_b$, taken from a position $b_1$ between the pair of semiconductor switches 12 of leg 14b; and a third output $i_c$, taken from a position $c_1$ between the pair of semiconductor switches 12 of leg 14c, are applied through lines 24, 26, and 28, respectively, to impart a drive voltage upon three-phase AC motor 20. Lines 24, 26, and 28 are further in electrical communication with position $a_2$ between the pair of semiconductor switches 12 of leg 14d, position $b_2$ between the pair of semiconductor switches 12 of leg 14e, and position $c_2$ between the pair of semiconductor switches 12 of leg 14f.

Figure 2:
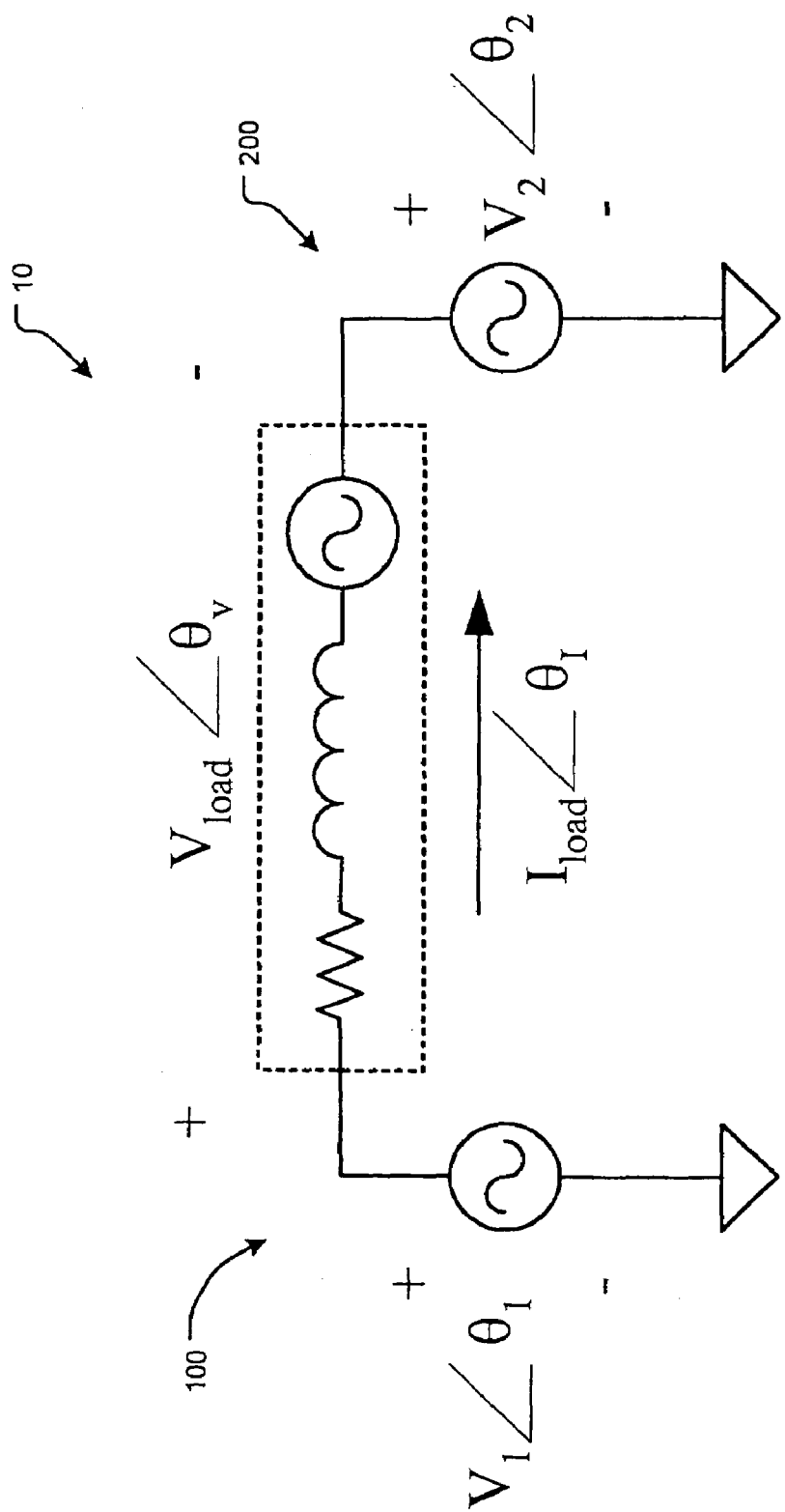
FIG. 2 is a per-phase equivalent circuit illustration the double-ended inverter drive system.

A controller 300 is provided and operably coupled to first section 100 and second section 200 at lines 302 and 304. Controller 300 is responsive to commands received from the driver of the vehicle 306 (i.e. accelerator pedal) and provides commands to first section 100 and second section 200, as will be described, to control the output of each section 100 and 200. High frequency pulse width modulation (PWM) is employed to control both first section 100 and second section 200 via controller 300 in order to control the voltage produced by first section 100 and second section 200. Using these PWM control methods, first section 100 and second section 200 each produces an equivalent balanced three-phase AC output voltage having the same fundamental frequency. Due to three-phase symmetry, double-ended inverter system 10 can be (conceptually) reduced to the one-line diagram illustrated in FIG. 2.

Employing PWM methods to control the amplitude and phase of the fundamental component of the output voltage of first section 100 and second section 200 permits the amplitude and phase of the voltage across the load, in this case AC motor 20, to be controlled. This enables control of the phase currents of AC motor 20 and, thus, the torque produced by AC motor 20. Since the load current is also the current that flows through semiconductor switches 12, the energy sourced (or sinked) by each section 100 and 200 is also regulated by controlling the output voltage and phase produced by each section 100 and 200. Through proper control of the output voltage and load current of first section 100 and second section 200, controlled power flow between primary energy source 16 and secondary energy source 18 is achieved. Of course, in the double-ended inverter system 10, another input will be needed to determine the power split between primary energy source 16 and secondary energy source 18. This would come from some higher level vehicle system controller which is regulating the state of charge of secondary energy source 18.

Therefore, according to the principles of the present invention, energy management of the hybrid vehicle can be achieved without the need for a separate power converter. This has the potential to realize a cost savings in addition to a weight reduction since additional bulky magnetic components, which are normally required in when using a separate power converter, are no longer required.

Power Flow Control

The present invention further describes the control of double-ended inverter system 10. In particular, three methods of controlling the power split or power distribution between primary energy source 16 and secondary energy source 18 are detailed. The present invention enables control of the power flow between primary energy source 16 and secondary energy source 18, without impacting the control (torque, speed) of AC motor 20. As a result, unified control of double-ended inverter system 10 is achieved.

With continued reference to a hybrid vehicle employing double-ended inverter system 10 illustrated in FIG. 1, it should be understood that the power, namely the torque and speed, delivered to the traction drive system (not illustrated) must be controlled for proper operation. Moreover, the power flow constraints must also be managed. For example, if one of the DC links was obtained from primary energy source 16 and one was obtained from secondary energy source 18, then the power flow between primary energy source 16, secondary energy source 18, and the traction drive system must be managed.

The present invention is thus capable of controlling the power flow in double-ended inverter system 10 as follows. The total power delivered to the load (i.e. AC motor 20), neglecting converter losses, is the sum of the two inverter powers, given as $$P = P_{c1} + P_{c2} \quad (1)$$

where the subscripts c1 and c2 represent first section 100 and second section 200, respectively. It should be recognized from equation (1) that any two of the powers of the equation can be controlled at any given time.

The power delivered to the load (i.e. AC motor 20) from each section 100 and 200 can be written in terms of the synchronous frame voltages and currents of each section 100 and 200 as:

$$P_{c1} = \frac{3}{2}(v^e_{q1} i^e_q + v^e_{d1} i^e_d) \quad (2)$$

$$P_{c2} = -\frac{3}{2}(v^e_{q2} i^e_q + v^e_{d2} i^e_d) \quad (3)$$

The minus sign in the power expression for second section 200 in equation (3) is a result of the current polarities defined in FIG. 1, which illustrates that the phase currents flows from first section 100 to second section 200. Substituting equation (2) and equation (3) into equation (1) yields:

$$P = \frac{3}{2}(v^e_{q1} - v^e_{q2}) i^e_q + \frac{3}{2}(v^e_{d1} - v^e_{d2}) i^e_d \quad (4)$$

Thus, the power flow to the load in equation (4) is now defined in terms of the individual inverter outputs.

Double-ended inverter system 10 may be better understood when it is considered as having two AC sources connected through a common load. From Kirchoff's voltage law, we are given:

$$v_{dq}^e = v_{dq1}^e - v_{dq2}^e \quad (5)$$

For hybrid vehicles, a likely configuration includes having the primary energy source converter links being fed by a prime mover and, furthermore, having secondary energy source converter links being fed by an energy storage element, such as a battery. Therefore, assuming that the link for first section 100 is the primary energy source and the link for second section 200 is the secondary energy source, three possible methods to actively control the overall inverter powers, while simultaneously producing the desired motor output power, are presented in the following sections.

Unity Power Factor Control

One method to control the power output of second section 200 is to operate that inverter with unity power factor while controlling its output voltage amplitude. The phasor diagram for this method is illustrated in FIGS. 3a and 3b.

Figure 3A:
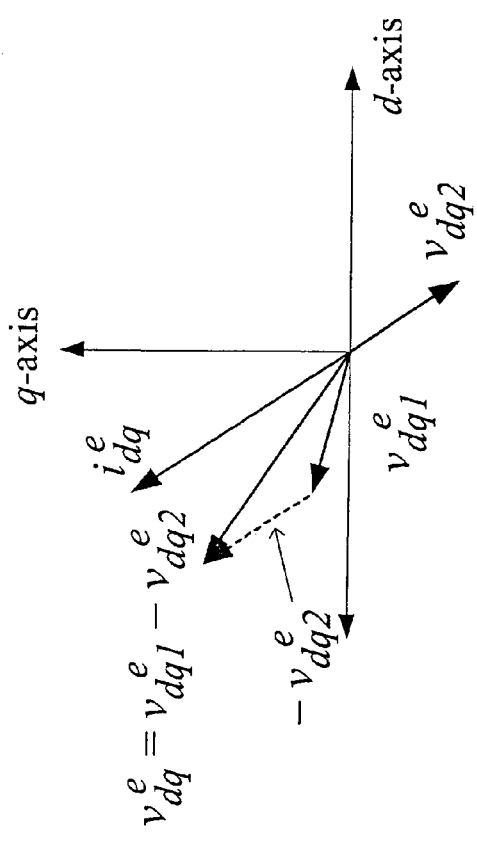
FIG. 3A is a phasor diagram of the double-ended inverter drive system during secondary energy source powering.
Figure 3B:
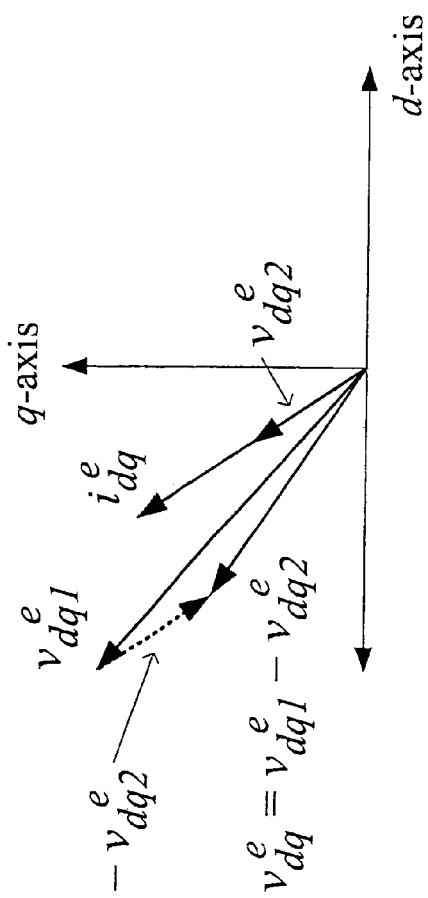
FIG. 3B is a phasor diagram of the double-ended inverter drive system when the secondary energy source is charging.

With particular reference to FIG. 3A, second section 200 is outputting a voltage 180° out of phase with the load current. This represents a condition that second section 200 is supplying power to the load with a unity power factor. It is important to recall the minus sign in equation (3) due to the current and voltage definitions, which results in the out of phase condition. The total voltage applied to the load is further illustrated in the FIG. 3B. FIG. 3B illustrates the phasor diagram for the same load current and load voltage condition, except that now secondary energy source 18 is absorbing power or being charged. As a result, the required voltage output of first section 100 has been increased. In order to regulate the power of secondary energy source 18, we assume that second section 200 is being operated at unity power factor. Therefore, we are left with:

$$\frac{v^{e*}_{q2}}{v^{e*}_{d2}} = \frac{i^{e*}_q}{i^{e*}_d} \quad (6)$$

where the * superscript indicates commanded values from the system controller.

Equation (6) can be rearranged as:

$$v^{e*}_{q2} = \frac{i^{e*}_q}{i^{e*}_d} v^{e*}_{d2}. \quad (7)$$

Equation (7) can be substituted into equation (3) as:

$$P^*_{c2} = -\frac{3}{2}\left(\frac{i^{e*2}_q}{i^{e*}_d} + i^{e*}_d\right) v^{e*}_{d2}. \quad (8)$$

Solving equation (8) and employing equation (7) yields:

$$v^{e*}_{d2} = -\frac{2}{3}\left(\frac{i^{e*}_d}{i^{e*2}_q + i^{e*2}_d}\right) P^*_{c2} \quad (9)$$

$$v^{e*}_{q2} = -\frac{2}{3}\left(\frac{i^{e*}_q}{i^{e*2}_q + i^{e*2}_d}\right) P^*_{c2} \quad (10)$$

The solutions given in equation (9) and equation (10) represent the required command voltages to secondary energy source 18 supplied by second section 200 in order to control the power of secondary energy source 18. It is important to note that the commanded currents will result from the system controller, which is producing the commands for the desired motor torque. Furthermore, system losses are not accounted for.

As a result, first section 100 will be acting as the "slack bus" in that it must produce the power to overcome that supplied to secondary energy source 18, the load, and system losses. Using equation (5) and substituting equation (9) and equation (10), the voltage command to the space vector modulator for first section 100 is given as:

$$v^{e*}_{dq1} = v^{e*}_{dq} + v^{e*}_{dq2}. \quad (11)$$

Figure 4:
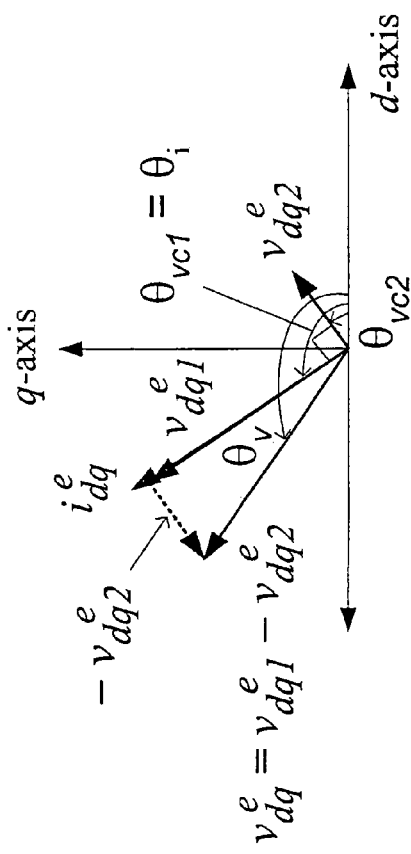
FIG. 4 is a phasor diagram of the double-ended inverter drive system when the secondary energy source is operating in quadrature.

An important operating condition exists in which primary energy source 16 is supplying all of the power to the load. In this case, secondary energy source 18 is not supplying any power nor is in a charging condition. One way for this to occur is to simply close the three upper (or more in the case of FIG. 1C) or three lower semiconductor switches 12 (or more in the case of FIG. 1C) in second section 200 to create an artificial wye-connection in windings 22. While creating an artificial wye connection eliminates any switching losses in second section 200, it also limits the voltage that can be applied to AC motor 20 to that which first section 100 could produce by itself. As a result, AC motor 20 will reach the limit where field weakening must occur at a lower speed. It is possible to further increase the available motor voltage by producing a voltage by second section 200 which is in quadrature with AC motor 20 current as illustrated in FIG. 4.

When the output voltage of second section 200 is in quadrature to that of the phase current, second section 200 is not processing any active power. However, the voltage produced by second section 200 adds to the available voltage of first section 100 such that the maximum available voltage of the system has been increased. Essentially, second section 200 is providing a portion (less than or equal to 100%) of the reactive power consumed by the load while first section 100 is supplying all of the active power and remaining reactive power. If first section 100 is supplying only the active power (section 200 supplying 100% reactive power), it will be operating in unity power factor to the load current.

From the system commands and current regulator output, the commanded voltage and current angles are given as:

$$\theta_i^* = a\tan 2\left(\frac{i_q^{e*}}{i_d^{e*}}\right) \quad (12)$$

$$\theta_v^* = a\tan 2\left(\frac{v_q^{e*}}{v_d^{e*}}\right). \quad (13)$$

The magnitudes of the individual converter voltages can be calculated as:

$$|v_{hq2}^{e*}| = |v_{dq}^{e*}|\sin(\theta_v^* - \theta_i^*) \quad (14)$$

$$|v_{dq1}^{e*}| = |v_{dq}^{e*}|\cos(\theta_v^* - \theta_i^*). \quad (15)$$

The voltage angles of the individual converters are given as:

$$\theta_{dq1}^* = \theta_i^* \quad (16)$$

$$\theta_{dq2}^* = \theta_i^* - 90° \quad (17)$$

Therefore, from equations (12)–(17), the individual converter d and q voltage commands can be calculated as:

$$v_{q1}^{e*} = |v_{dq1}^{e*}|\sin(\theta_{dq1}^*) \quad (18)$$

$$v_{d1}^{e*} = |v_{dq1}^{e*}|\cos(\theta_{dq1}^*) \quad (19)$$

$$v_{q2}^{e*} = |v_{dq2}^{e*}|\sin(\theta_{dq2}^*) \quad (20)$$

$$v_{d2}^{e*} = |v_{dq2}^{e*}|\cos(\theta_{dq2}^*) \quad (21)$$

Optimum Inverter Utilization Control

Figure 5:
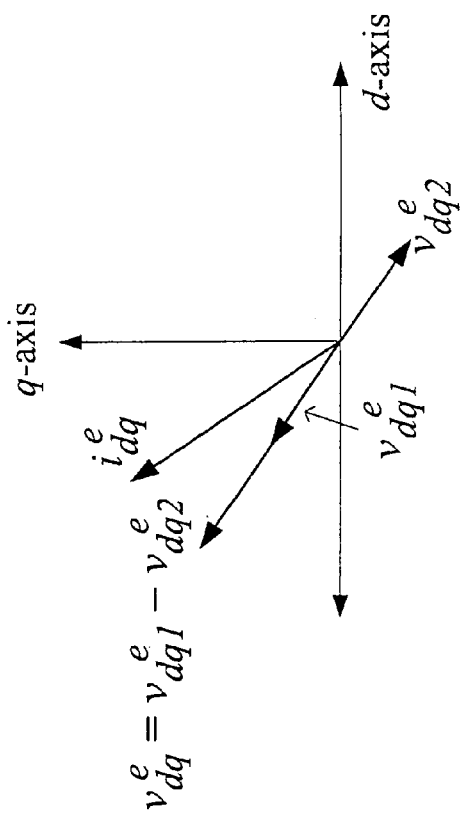
FIG. 5 is a phasor diagram of the double-ended inverter drive system when the primary and secondary energy sources are producing maximum output.

The maximum output voltage of double-ended inverter system 10 (as seen by the load) occurs when first section 100 and second section 200 are each outputting their maximum phase voltage, with the phase voltages out of phase by 180°. The phasor diagram for this control method is illustrated in FIG. 5.

For the optimum inverter utilization control, the output voltages of first section 100 and second section 200 are co-linear. As a result, required voltages are simply proportional to the desired power. Therefore, second section 200 commands are given as:

$$v_{q2}^{e*} = -\frac{P_2^*}{P^*}v_q^{e*} \quad (22)$$

$$v_{d2}^{e*} = -\frac{P_2^*}{P^*}v_d^{e*} \quad (23)$$

where P is the commanded load power which can be found from:

$$P^* = \frac{3}{2}(v_d^{e*}i_d^{e*} + v_q^{e*}i_q^{e*}). \quad (24)$$

The commanded voltage to first section 100 can then be calculated by substituting equation (22) and equation (23) into equation (24).

The description of the present invention is merely exemplary in nature and, thus, variations that do not depart from the gist of the present invention are intended to be within the scope of the present invention. Such variations are not to be regarded as a departure from the spirit and scope of the present invention.

What is claimed is:

1. A method of providing a unified power control of a motor, said method comprising:
   providing a first inverter system, a second inverter system, and a first motor coupled there between, said first motor having a set of windings wherein each winding of said set includes a first end and a second end;
   coupling said first inverter system to a first energy source;
   coupling said first ends of said windings to said first inverter system;
   coupling said second inverter system to a secondary energy source;
   coupling said second ends of said windings to said second inverter system;
   generating a first pulse width modulated signal;
   generating a second pulse width modulated signal;
   wherein total power delivered to said first motor is a sum of a first inverter power and a second inverter power; and
   driving said first inverter system and said second inverter system with said first pulse width modulated signal and said second pulse width modulated signal to independently control a fundamental component of an output voltage of said first inverter system and said second inverter system to achieve a desired varying power split between said first energy source and said second energy source to control the motor.

2. The method according to claim 1 wherein said fundamental component of said first inverter system is out of phase with a said fundamental component of said second inverter system.

3. The method according to claim 2 wherein said providing a second inverter system includes providing a second inverter system having a first semiconductor switch and a second semiconductor switch arranged in series defining a first leg, a third semiconductor switch and a fourth semiconductor switch arranged in series defining a second leg, and a fifth semiconductor switch and a sixth semiconductor switch arranged in series defining a third leg.

4. The method according to claim 3, further comprising:
   closing said first, third, and fifth semiconductor switches simultaneously to limit a voltage applied to the motor.

5. The method according to claim 1 wherein said fundamental component of said first inverter system is 180° out of phase with said fundamental component of said second inverter system.

6. A method of providing a unified power control of a motor, said method comprising:
   providing a first inverter system;
   providing a second inverter system having a first semiconductor switch and a second semiconductor switch arranged in series defining a first leg, a third semiconductor switch and a fourth semiconductor switch arranged in series defining a second leg, and a fifth semiconductor switch and a sixth semiconductor switch arranged in series defining a third leg;
   providing a first motor having a set of windings; wherein each winding of said set includes a first and a second end;
   coupling said first inverter system to a first energy source;
   coupling said first ends of said windings to said first inverter system;
   coupling said second inverter system to a secondary energy source;
   coupling said second ends of said windings to said second inverter system;
   generating a first pulse width modulated signal;
   generating a second pulse width modulated signal;
   wherein total power delivered to said first motor is a sum of a first inverter power and a second inverter power; and
   driving said first inverter system and said second inverter system with said first pulse width modulated signal and said second pulse width modulated signal to independently control a fundamental component of an output voltage of said first inverter system and said second inverter system to achieve a desired varying power split between said first energy source and said second energy source to control the motor.

7. The method according to claim 6 wherein said fundamental component of said first inverter system is out of phase with a said fundamental component of said second inverter system.

8. The method according to claim 7 wherein said providing a first inverter system includes providing a first inverter system having a seventh semiconductor switch and an eighth semiconductor switch arranged in series defining a fourth leg, a ninth semiconductor switch and a tenth semiconductor switch arranged in series defining a fifth leg, and an eleventh semiconductor switch and a twelfth semiconductor switch arranged in series defining a sixth leg.

9. The method according to claim 8, further comprising:
   closing said first, third, and fifth semiconductor switches simultaneously to limit a voltage applied to the motor.

10. The method according to claim 6 wherein said fundamental component of said first inverter system is 180° out of phase with said fundamental component of said second inverter system.

11. A method of providing a unified power control of a motor, said method comprising:
    providing a first inverter system having a first semiconductor switch and a second semiconductor switch arranged in series defining a first leg, a third semiconductor switch and a fourth semiconductor switch arranged in series defining a second leg, and a fifth semiconductor switch and a sixth semiconductor switch arranged in series defining a third leg;
    providing a second inverter system having a seventh semiconductor switch and an eighth semiconductor switch arranged in series defining a fourth leg, a ninth semiconductor switch and a tenth semiconductor switch arranged in series defining a fifth leg, and an eleventh semiconductor switch and a twelfth semiconductor switch arranged in series defining a sixth leg;
    providing a first motor having a set of windings wherein each winding of said set includes a first end and a second end;
    coupling said first inverter system to a first energy source;
    coupling said first ends of said windings to said first inverter system;
    coupling said second inverter system to a secondary energy source;
    coupling said second ends of said windings to said second inverter system;
    generating a first pulse width modulated signal;
    generating a second pulse width modulated signal;
    wherein total power delivered to said first motor is a sum of a first inverter power and a second inverter power; and
    driving said first inverter system and said second inverter system with said first pulse width modulated signal and said second pulse width modulated signal to independently control a fundamental component of an output voltage of said first inverter system and said second inverter system to achieve a desired varying power split between said first energy source and said second energy source to control the motor.

12. The method according to claim 11 wherein said fundamental component of said first inverter system is out of phase with said fundamental component of said second inverter system.

13. The method according to claim 11 wherein said fundamental component of said first inverter system is 180° out of phase with a said fundamental component of said second inverter system.

14. The method according to claim 11, further comprising:
    closing said seventh, ninth, and eleventh semiconductor switches simultaneously to limit a voltage applied to the motor.

* * * * *